Feb. 20, 1968  R. J. PIERCE  3,369,516
STABLE OCEANIC STATION
Filed March 17, 1966
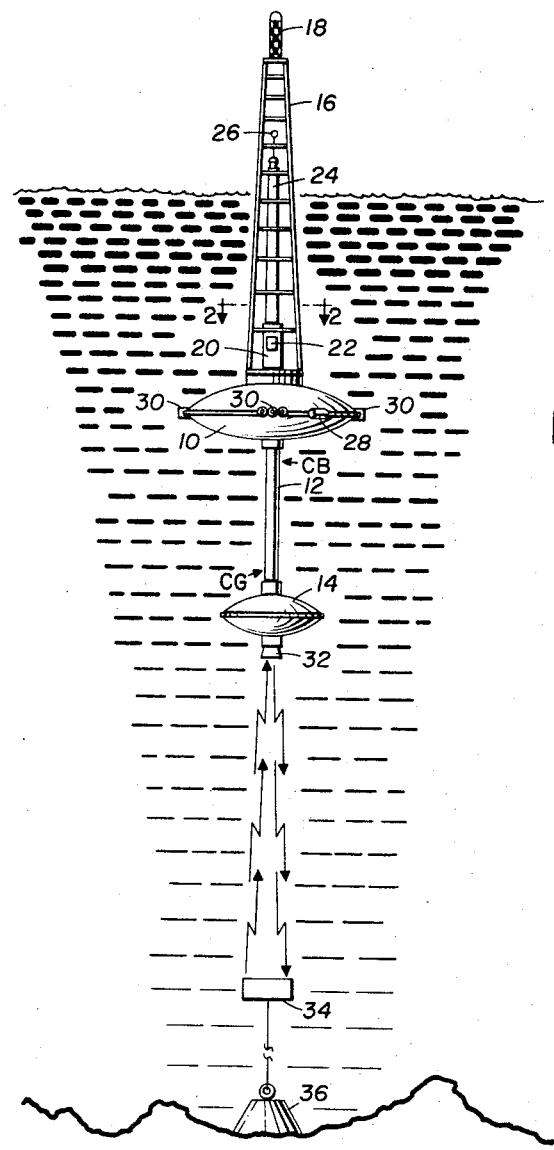
FIG 1
FIG 2
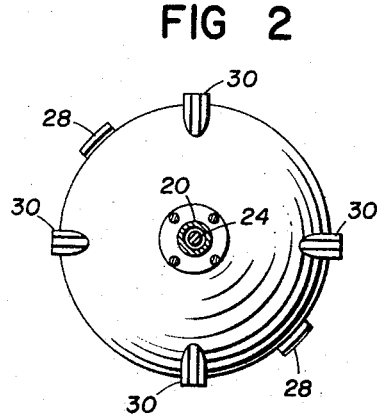
INVENTOR.
ROGER J. PIERCE
BY *James C. Nemmers*
ATTORNEY

United States Patent Office 3,369,516
Patented Feb. 20, 1968

3,369,516
STABLE OCEANIC STATION
Roger J. Pierce, 900 Staub Court, NE.,
Cedar Rapids, Iowa 52402
Filed Mar. 17, 1966, Ser. No. 535,213
10 Claims. (Cl. 114—144)

ABSTRACT OF THE DISCLOSURE

A structure designed to serve as a fixed station in the open sea, the structure being designed so as to have excellent stability and to maintain a fixed geographic location and thereby is substantially unaffected by wind and water forces.

This invention relates to deep sea structures and more particularly to an oceanic station that is extremely stable regardless of the wind and water forces exerted upon it.

Although over three-fourths of the earth's surface is covered by water, of which our oceans comprise the greatest portion, relatively little effort has been exerted by man to use and exploit this vast waterland. At the present time, the world is witnessing advances in aerospace technology which were thought almost impossible not too many years ago. Although overshadowed by the exploitations into outer space, there is an increasing interest in utilization and exploration of the seas. One area of greatly increased interest is in the development of communications installations at sea. For example, oceanic stations containing electronically instrumented communications systems could be used to overcome the disadvantages of present methods of communication using underwater cables and high frequency radio circuits. A fixed oceanic station could relay oceanic data or signals from passing aircraft or space craft via a synchronous satellite and send it long distances to shore. Multiple oceanic stations could also be used for Synoptic Ocean Data Systems for weather and military surveillance.

Since any object in the sea is subjected to the greatly fluctuating forces of surface waves and wind, and to a certain degree under-water ocean currents, whereas a land installation is normally subjected only to wind force, an oceanic structure must be designed to overcome all of these forces in order to approach stability.

Ideally, it would be desirable to have an oceanic station which would be as stable as a land station. However, to even approach the stability of a land installation, an oceanic station must have a high degree of vertical stability, depth stability and geographical position stability. This can be achieved by proper design involving inherent stability augmented by powered stability. The power for stability and station-keeping in the large structures required is quite large and would be needed over long periods of time. This indicates the ultimate use of atomic power.

Prior art attempts to provide a stabilized deep sea or oceanic station have been only partially successful. The present methods and experiments being conducted with floating surface buoys have not been satisfactory because of the basic stability of a buoy. Moreover, all surface buoys and other known "stationary" oceanic structures have required tethering systems anchored to the ocean floor in order to maintain both their depth stability as well as geographical position stability. Such tethering systems have obvious disadvantages when utilized to maintain depth stability as well as geographical position stability. Moreover, known designs of prior art oceanic stations are not particularly adaptable for the installation of adequate equipment that will perform reliably over long periods of time. Therefore, prior art oceanic stations of any type have not been employed commercially, but rather have been used primarily for experimental purposes.

The general philosophy of the invention disclosed herein is that in order to achieve stability in an oceanic structure, the major part of the structure should be submerged below the surface of the ocean at depths where the water is relatively unaffected by the surface disturbances. Moreover, the amount of structure protruding above the ocean surface should be minimized to expose the least possible area to the forces of winds and surface waves. This concept together with a unique approach in configuration for inherent stability and station keeping without anchoring form the basis of this invention.

An oceanic station properly designed according to the principles of my invention will have a very high degree of vertical stability as well as depth stability even when subjected to winds of 100 to 120 knots and surface waves of trough-to-crest heights of 40 to 50 feet. Moreover, an oceanic station designed according to the principles of my invention can be stabilized at almost any selected depth and kept on station without deep sea anchoring.

It is therefore a principal object of my invention to provide an oceanic station which is inherently stable in depth and pitch about the vertical axis within acceptable limits and which is therefore suitable for use in many applications, particularly in the communications field using highly directive antenna.

It is another object of my invention to provide a relatively simple structure suitable for use as an unattended oceanic station over a long period of time. However, the invention provides for raising of the entire structure to the surface for any necessary maintenance.

It is another object of my invention to provide an oceanic station which has inherent stability about the vertical axis and in depth within limits not attainable by prior art structures or stations and which can, if desired, be augmented by means providing for varying its set depth, and maintaining azimuth.

It is a further object of my invention to provide improved means for maintaining the geographical position of an oceanic station. In accordance with this object, it is my intention to provide means which require no tethering or anchoring system to hold position.

It is a still further object of my invention to provide an inherently stable oceanic station capable of carrying and providing space for a considerable amount of equipment together with the necessary power means to operate the equipment thereby making the station useful in many and varied applications.

These and other objects of my invention will be readily apparent from consideration of the following description taken in connection with the accompanying drawing, which illustrates a preferred embodiment of my invention and in which:

FIG. 1 is an elevational view of a structure embodying the principles of my invention and showing the same in an upright position as it would normally rest in the sea and also illustrating means of maintaining geographical position stability; and FIG. 2 is a sectional view taken on the line 2—2 of FIG. 1 showing the buoyant structure from the top.

Referring now to the drawing, there is shown a preferred form of an oceanic station which incorporates the principles of my invention. The station includes a hollow buoyant structure, indicated generally by the reference numeral 10, which is shaped somewhat like a discus for minimum water drag. Depending from the buoyant structure 10 and rigidly connected thereto by member 12 is a stabilizing structure 14 shaped similar to the buoyant structure 10. The rigid member 12 is preferably tubular and is relatively small in diameter but of a diameter sufficiently large to provide the necessary structural strength to support the structure 14. The rigid member 12 is connected to the buoyant structure 10 and structure 14 so as to be substantially perpendicular to the median planes through the structures which median planes are therefore substantially parallel. The structure 14 provides a chamber that serves to house any suitable ballast material which will add the needed amount of mass to the oceanic station. For example, structure 14 might be filled with lead in order to provide the desired mass without increasing the volume of structure 14 any more than necessary. Structure 14 is preferably made as small as possible to minimize its resistance to under-water currents.

On top of the buoyant structure 10 there is fixed a vertically extending structure such as tower 16 atop which a suitable radio antenna 18 is mounted. It will be understood that the tower 16 and antenna 18 are of any suitable design to serve the purpose for which the oceanic station is to be used. In other words, in some applications, the tower 16 may not be used but rather a simple mast or antenna may be all that is needed. It is preferable to keep the structure above the buoyant structure 10 as small as possible so it will present a minimum area upon which wind and wave forces can act.

The station shown is also provided with a conning tower 20 having an entrance hatch 22 to provide access to the station for maintenance. A snorkel tube 24 is also provided for air and to allow surface access. The station is also preferably provided with a high intensity light 26 for obstruction warning.

From the above description, it is evident that the basic components of my novel oceanic station are the buoyant structure 10, the stabilizing structure 14 rigidly connected to the buoyant structure 10, and a vertical structure such as the tower 16. The relative size, weight, and shapes of these basic components are very important to the stability of the station. With regard to vertical stability, the mass of the structure, its center of gravity, and location of the center of gravity relative to the center of buoyancy are primary considerations. Another primary consideration is that the buoyant structure 10 be located at sufficient depth below the surface so that it is in "quiet water" undisturbed by surface waves. Therefore, the major disturbing forces of surface wind and waves act only on the exposed area of the tower 16 and antenna 18.

In theory, vertical stability is increased by locating the center of gravity (CG) of the structure as far below the center of buoyancy (CB) as is practical. This requires that a large mass be concentrated below the center of buoyancy. Ideally, the center of gravity of my oceanic station would coincide with the center of mass of the stabilizing structure 14, but because of the other necessary structures, such as towers, antennas, etc., the center of gravity (CG) will lie somewhat above the center of mass of the stabilizing structure 14, as indicated in FIG. 1. The size of the stabilizing structure 14 is limited because of the drag produced by increasing the overall size of this structure. To achieve the best overall stability, my novel station is therefore designed so that the center of buoyancy (CB) lies near the confines of the buoyant structure 10 as shown in FIG. 1, and the center of gravity (CG) lies near the confines of the stabilizing structure 14, as shown. Obviously, the heavier and more concentrated the mass within the stabilizing structure 14 and the further that structure is located from the center of buoyancy (CB), the greater the surface wind and wave forces that can be resisted by the structure without tilting from the vertical. The area of the structure which is subjected to wind and surface waves (basically the tower 16 and antenna 18) is minimized in my novel station, and thus the total of these forces on the structure is relatively small. Moreover, the moments created by the wind and surface wave forces are resisted by extremely large moments produced by the large mass located as far as practical from the center of buoyancy, as explained above. Of course, the overall structure of the station is designed so that it will stabilize itself at a depth with the buoyant structure 10 located far enough below the surface of the water so that the effects of surface waves on the large buoyant structure 10 are negligible. Scale model tests have shown that a station built in accordance with the principles of my invention is vertically stable within ±0.5 degrees when subjected to 60 m.p.h. winds and 12 foot waves.

Although for a station of this type vertical stability is probably the most important design consideration, depth stability is also of importance. By designing the station so that the structure below the surface of the water displaces a volume of water equal in weight to the total weight of the structure both above and below the water, the station will stabilize itself at a desired depth. With a station of a given physical size, the depth can be varied by varying the weight of the structure. Because my novel station requires a large mass in order to achieve vertical stability, the buoyant structure 10 must be sufficiently large to displace the necessary amount of water to stabilize the station at neutral buoyancy at the desired depth. At the chosen depth, the station will be inherently stable because any force tending to sink it will lower more of the tower 16 and snorkel tube 24 below the water's surface and thus cause more water to be displaced and thereby increase the buoyancy which will oppose the force tending to sink the structure. Conversely, any force which tends to raise the structure will raise more of the structure out of the water and less water will be displaced, thereby decreasing the buoyant force to oppose the rise. Thus, the basic structure of my invention will be very stable as to depth within relatively small limits.

Although the basic structure of my novel station is inherently depth stable, the system can be augmented by a depth sensor and a ballast tank with a servo-controlled pneumatic system. For example, a ballast tank would be provided within the buoyant structure 10 or to the stabilizing structure 14 and a pressure sensor suitably located on the station to actuate the pneumatic system (not shown) to draw water into or blow it out of the ballast tank and thereby compensate for any changes in depth. These tanks could be compartmented and differentially filled to hold the center of gravity in line with the vertical axis to prevent static tilt of the structure. The use of such a water ballast system would have one further advantage. The system could be used to command the station to submerge to the desired depth and maintain that depth within limits of a few feet. Should it be necessary for reasons of repair or any other reason to surface the station, it could be commanded to the surface by a signal to the sensor which would actuate the pneumatic system and blow water out of the ballast tank thereby causing the station to rise to the surface and making the conning tower 20 and entrance hatch 22 accessible from above the surface. The water ballast system might also be used to augment the inherent depth stability of the structure by compensating for changes in water density caused by variations in water density because of changes in the salinity, temperature, etc. of the water or because of the amount of apparatus aboard.

Augmentation of azimuth stability is achieved by tangential jets 32, shown in FIG. 2 on the buoyant structure 10, which operate in conjunction with a propulsion control system slaved to a magnetic compass.

For most communications applications, restriction of the geographical position of an oceanic station within a radius of one mile from a fixed reference point is satisfactory. Drifting of the structure is caused by wind and waves, both of which are widely variable but which act against the relatively small area of the station that is above the water, and underwater ocean currents, which are continuous and which operate against the relatively large submerged area of the structure. Thus, drag becomes an important factor in the design. In my novel oceanic station, the components have been designed to keep drag to a minimum. Obviously, however, the overall size and shape of the station are dependent upon the application for which the structure is designed. The larger the structure, the more the drag and vice versa.

Geographical position stability can be achieved in many different ways. Direct anchoring of the station to the ocean bottom, which may be at a depth of 1 to 5 miles, obviously involves the use of long, heavy anchor chains or cables to withstand the forces produced by the wind, waves, and ocean currents and which cause the station to drift. Also, such direct anchoring arrangements can affect the depth stability since the downward component of the anchor force will tend to pull the tower 16 below the surface.

A novel means of achieving geographical position stability of the oceanic station is by means of a combination propulsion and navigation system. Such a system would require power to operate it, and would, in effect, make a powered vehicle out of the station. However, with the development of atomic power, it is not inconceivable that such power could be used in an oceanic station to provide the large amount of energy that is needed over a long period of time. The propulsion system would include a plurality of propellers or jets 30 located around the circumference of the buoyant structure 10 so that the station could be moved in any direction. To control the propulsion so that position of the station is maintained, a SONAR system 32 is provided and affixed to the bottom of the stabilizing structure 14 or at any other suitable location on the station, such as the buoyant structure 10. A passive or active reflector 34 is connected to an anchor 36 resting on the ocean floor to provide the navigational point of reference from which the SONAR system will control the propulsion system and cause the station to "hover" over the reference point provided by the reflector 34. The SONAR reflector 34 or active transponder is located sufficiently above the bottom to avoid reflections from ocean bottom irregularities.

To optimize the dynamic stability, the moment of inertia of the structure can and should be adjusted to insure that resonances do not occur in heavy seas.

The basic structure which is disclosed herein has many applications. It could be used in multiples to support other structures. However, because of the inherent stability of the design, it has wire application in communications systems. For example, when using the station with an antenna of high directivity for pointing constantly at synchronous satellites, a high degree of vertical stability and azimuth stability is required. The basic design of my station is such that it is suitable for this type of service by reason of its inherent stability and any necessary augmented stability in azimuth or depth. Having thus described my invention and illustrated it in connection with a basic structure of a preferred embodiment, it will be obvious to those skilled in the art that the principles thereof can be embodied in other specific forms without departing from the spirit and scope of the invention. It is my intention, however, that specific revisions and modifications which are obvious to those skilled in the art and all changes which may come within the range of equivalents will be embraced within the scope of the following claims.

I claim:

1. An inherently stable station for use in large bodies of water such as the ocean, said station comprising a buoyant structure of sufficient size so that when said structure is totally submerged at a selected depth the portion of said station below the surface of the water displaces a volume of water equal in weight to the total weight of the station whereby said station is stable at said selected depth, a stabilizing structure having a high-density concentrated mass and which structure is substantially smaller in size and separate from said buoyant structure, first means rigidly connecting said stabilizing structure to said buoyant structure at a selected distance directly beneath said buoyant structure, said first means being substantially more slender than either said buoyant structure or said stabilizing structure and no larger than necessary to provide the necessary structural strength, a tower structure extending upwardly from the top of said buoyant structure and adapted to protrude partly above the surface of the water, said tower structure being constructed to provide minimum resistance to wind and water forces, said buoyant and stabilizing structures being constructed in size and weight and sufficiently spaced apart so that the center of gravity of said station is located a substantial distance below the center of buoyancy and near the center of mass of said station and the vertical force so produced greatly exceeds the lateral forces exerted by the wind and water on said station, the total weight of said station being just equal to the buoyant force on the submerged portion of said station when said buoyant structure and said stabilizing structure are submerged at the desired depth in the deep quiet water unaffected by surface conditions and when said tower structure is at the desired height above the surface of the water, a ballast tank, second means to admit into and discharge water from said ballast tank, and depth control means on board said station responsive to a signal transmitted thereto from a source external of said station to provide for changing the depth of said station, said second means being responsive to said depth control means.

2. An inherently stable station for use in large bodies of water such as the ocean, said station comprising a buoyant structure, a stabilizing structure having a high-density mass which is concentrated and separated from said buoyant structure, means rigidly connecting said stabilizing structure to said buoyant structure at a selected distance directly beneath said buoyant structure, said means being substantially more slender than either said buoyant structure or said stabilizing structure and no larger than necessary to provide the necessary structural strength, and a tower structure extending upwardly from the top of said buoyant structure and adapted to protrude partly above the surface of the water, said tower structure being constructed to provide minimum resistance to wind and water forces, said buoyant structure being substantially more extensive laterally than vertically, said buoyant and stabilizing structures being constructed in size and weight and sufficiently spaced apart so that the center of gravity of said station is located a substantial distance below the center of buoyancy and near the center of mass of said station and the vertical force so produced greatly exceeds the lateral forces exerted by the wind and water on said station, the total weight of said station being just equal to the buoyant force on the submerged portion of said station when said buoyant structure and said stabilizing structure are submerged at the desired depth in the deep quiet water unaffected by surface conditions and when said tower structure is at the desired height above the surface of the water.

3. The oceanic station of claim 2 in which the exterior configuration of said buoyant structure and said stabilizing structure are each shaped to minimize the resistance of said structures to forces exerted thereon by underwater currents, and the means rigidly connecting said buoyant structure and said stabilizing structure is constructed to minimize its resistance to underwater forces while providing the necessary structural strength to rigidly connect the buoyant and stabilizing structures.

4. The oceanic station of claim 2 in which said buoyant structure is of sufficient size that when said buoyant structure is totally submerged at a selected depth the portion of said station below the surface of the water displaces a volume of water equal in weight to the total weight of the structure whereby said station is stable at said selected depth.

5. The oceanic station of claim 2 in which said station is provided with a ballast tank contained within said buoyant structure, means is provided to admit into and discharge water from said ballast tank, and depth control means is provided onboard said station responsive to the depth of said station, said water admission and discharge means being responsive to said depth control means to maintain said station at a selected depth.

6. The oceanic structure of claim 2 in which said buoyant structure is provided with propulsion means adapted to exert a force on said station tangential with respect to the central vertical axis of said station to provide azimuth control and means responsive to rotation of said station about said vertical axis to actuate said propulsion means and thereby maintain said station in a substantially fixed azimuth position.

7. In combination with the oceanic station of claim 2, fixed means on the ocean floor providing a reference point, propulsion means combined with said station adapted to move said station in any direction transverse to its vertical axis, and means for controlling said propulsion means in response to movement of said station away from said reference point to maintain said station in substantially the same geographical position with respect to said reference point.

8. The oceanic station of claim 2 in which said buoyant structure provides an interior chamber, means is provided in said structure for access to said chamber, said chamber being adapted to house suitable controls and equipment for said station, and said tower structure is adapted for the mounting of suitable radio antenna, oceanic sensors, obstruction lights and other desired equipment.

9. The oceanic station of claim 2 in which said stabilizing structure also is substantially more extensive laterally than vertically.

10. An inherently stable station for use in large bodies of water such as the ocean, said station comprising a buoyant structure, means rigidly connecting said stabilizing structure to said buoyant structure at a selected distance beneath said buoyant structure, the exterior configuration of said buoyant structure and said stabilizing structure each being somewhat discus-shaped with the median plane through each of said structure being parallel thereby minimizing the resistance of said structures to forces exerted thereon by underwater currents, said means rigidly connecting said buoyant structure and said stabilizing structure being constructed to minimize its resistance to underwater forces while providing the necessary structural strength to rigidly connect the buoyant and stabilizing structures, and a tower structure extending upwardly from the top of said buoyant structure, said tower structure being constructed to provide minimum resistance to wind and water forces, the total weight of said station being just equal to the buoyant force on the submerged portion of said station when said buoyant structure and said stabilizing structure are submerged at the desired depth in the deep quiet water unaffected by surface conditions and when said tower structure is at the desired height above the surface of the water.

References Cited

UNITED STATES PATENTS

| | | | |
|---|---|---|---|
| 1,137,222 | 4/1915 | Leon | 244—76 |
| 2,310,017 | 2/1943 | Canon et al. | 9—8 X |
| 3,080,583 | 3/1963 | Fuller | 9—8 |
| 3,092,852 | 6/1963 | Devereux | 9—8 |
| 3,160,850 | 12/1964 | Dudley | 114—144 |
| 3,145,683 | 8/1964 | Kolb et al. | 114—144 |

ANDREW H. FARRELL, *Primary Examiner.*